2 Sheets—Sheet 1.

A. J. GREENMAN.
CORN-PLANTER.

No. 180,473. Patented Aug. 1, 1876.

Witnesses.
B F Latham
A. G. Perrigo

Inventor.
A. J. Greenman

2 Sheets—Sheet 2.
A. J. GREENMAN.
CORN-PLANTER.
No. 180,473. Patented Aug. 1, 1876.
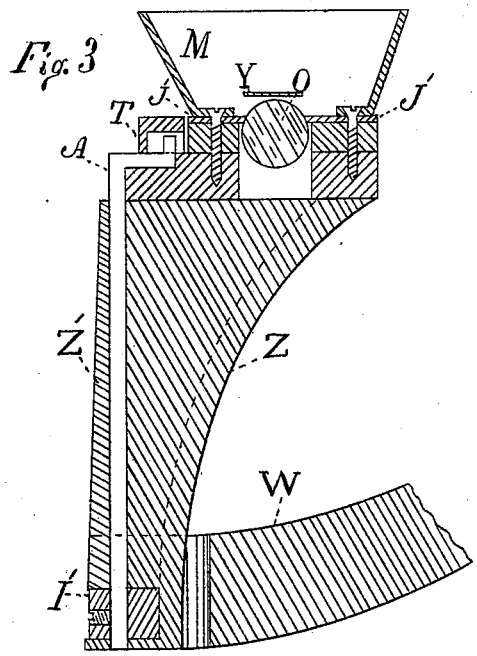
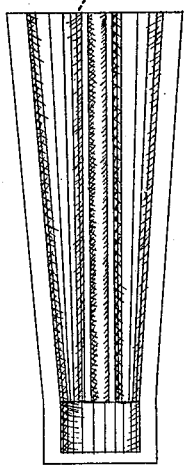
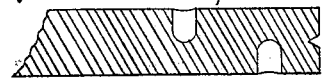
Witnesses.
B F Latham
A. J. Perrigo
Inventor.
A. J. Greenman.

UNITED STATES PATENT OFFICE.

ARNOLD J. GREENMAN, OF MONTICELLO, INDIANA, ASSIGNOR OF ONE-HALF HIS RIGHT TO RENSSELEAR GREENMAN, OF SAME PLACE.

IMPROVEMENT IN CORN-PLANTERS.

Specification forming part of Letters Patent No. 180,473, dated August 1, 1876; application filed August 30, 1875.

*To all whom it may concern:*

Be it known that I, ARNOLD J. GREENMAN, of Monticello, State of Indiana, have invented an Improved Corn-Planter, of which the following is a specification:

The object of my invention is to provide a means of planting corn or other seeds accurately upon marks made transversely with the direction in which the planter is drawn, and to plant equally well in soft or hard ground.

Figure 1:
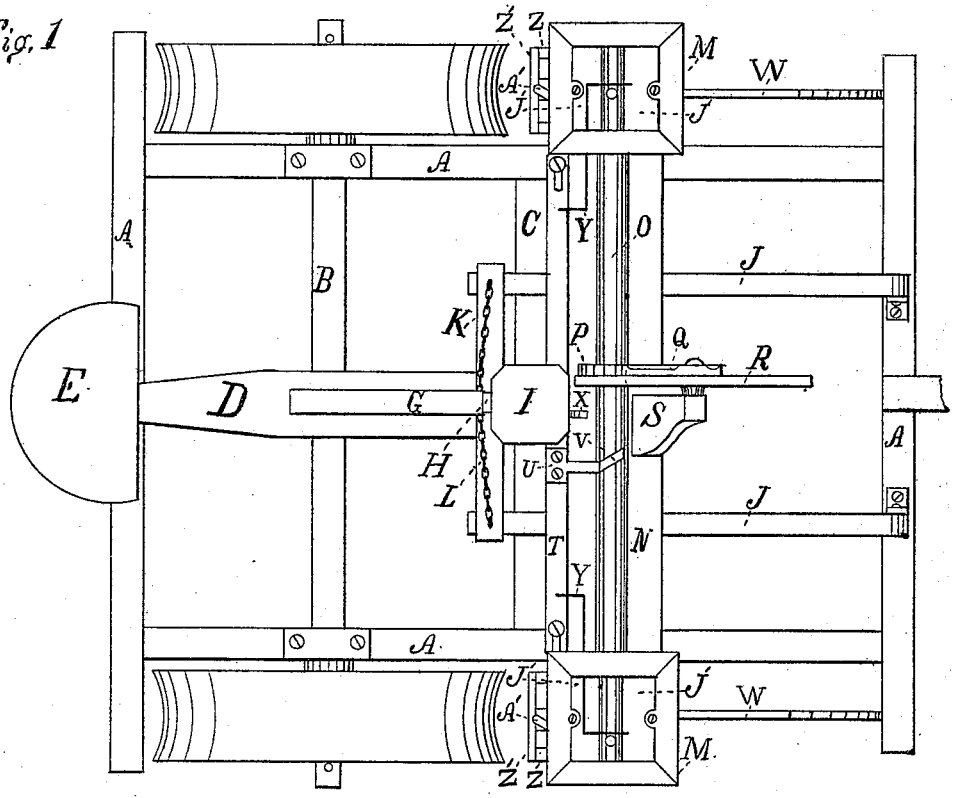
Figure 2:
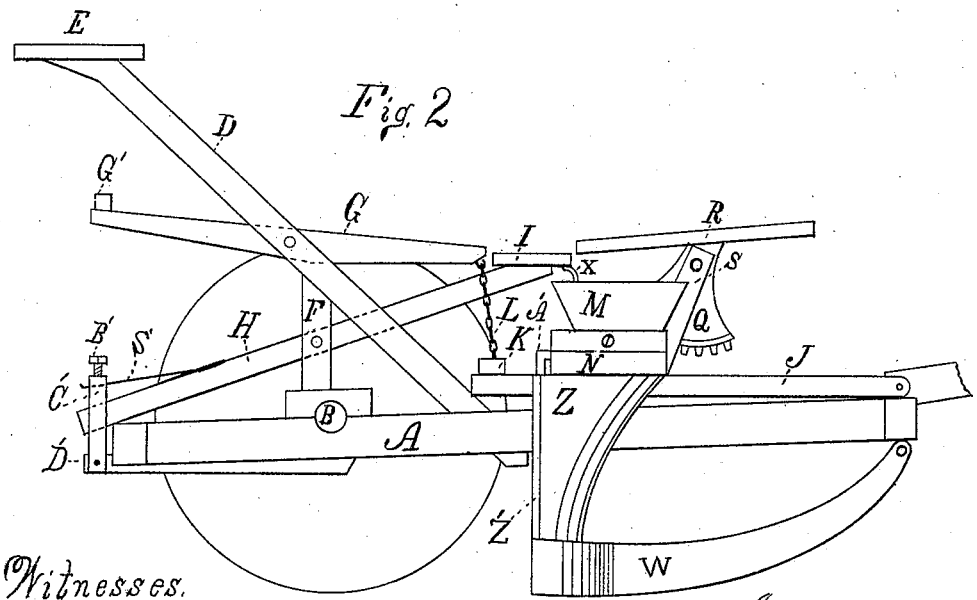

In the drawings, Figure 1 is a plan or top view. Fig. 2 is a side elevation, with the wheel on the side from which the view is taken removed, so as to better show the mechanism. Fig. 3 is a vertical longitudinal section through the center of the box M, standard Z, plate Z', rotating block I, and a portion of the runner W. Fig. 4 is a rear elevation of the standard Z with the plate Z' removed, showing at the bottom the recess occupied by the block I', and down through the center the recess occupied by the shaft A', and at either side the recesses down which the grain passes on its way to the ground. Fig. 5 is a longitudinal section of one end of the shaft O, showing the openings which take the grain from the box M and drop it down to the plate forming the bottom of the standard. Fig. 6 is a plan view of the rotating block I'.

In the drawings, A A A A, Fig. 1, is a quadrangular frame, provided with the axle B for mounting suitable wheels, and provided also with a cross-piece, to which the lower end of the bar D is secured, the said bar having at its upper end a seat, E, for the driver. The said bar is supported near its center by the upright F, said upright being attached to and supported by the axle B. Passing through and pivoted in the upright F is a lever, H, carrying on its forward end the seat I for the dropper. The rear end of the lever H is provided with the spring S' on its upper side, the lever and spring passing through the clasp C', the said clasp being pivoted to the bar D' and provided with a screw, B', for purposes to be hereinafter specified. The seat I is provided with a bar, $x$, projecting downward, its lower end near the bar N.

A second frame is formed of the levers J J and cross-bar K. The bar N is placed on the levers, forward of the cross-bar K, to which is attached the whole apparatus for placing the grain on the ground, the said apparatus being pivoted at its forward end, and its rear end suspended by the chain L to the lever G. The said lever G passes through and is pivoted to the bar D, and its rear end provided with the cross-piece G', on which the driver places his feet, depressing the rear end and elevating the front end of the lever G, and, by means of the chain L, elevating the rear end of the frame and its attachments. To form the dropping apparatus, the horizontal bar N is provided with an upright, S, to which is pivoted a toothed segment, Q, said segment being provided with the lever R and engaging with the pinion P secured on the shaft O, the said shaft being provided with a cam-shaped groove, V, in which the pawl U is placed, the said pawl being secured to the sliding bar T. The said bar is provided with the fingers Y Y, in form as shown in Fig. 1, which pass through small openings in the boxes M M, their use being to draw the grain into the openings in the shaft O. The sliding bar is also provided with transverse slots in its lower side, in the proper place near either end, the use of said slots being to actuate the upright shafts A' A' and rotating blocks I' I'.

In its operation, the boxes M M are filled with the grain and the machine drawn forward, the runners W W making grooves in the ground for the reception of the grain. The dropper then, grasping the lever R, forces it down. This operation gives the shaft O (by means of the segment and pinion) a half rotation. This, in turn, by means of the cam-groove V and fixed pawl U, gives a sliding motion to the sliding bar T, which carries the fingers Y Y toward the openings in the shaft O, and, filling them with grain, which is swept off even with the surface of the shaft, by the rubbers J' J' J' J', the charge of grain falling down the recesses of the standards Z Z until arrested by the plate forming the bottom of the said standards. It is also prevented from falling out of the rear of the said standards by the projections on the rotating blocks I' I', which, by the motion of the sliding bar T and shafts A' A', close the back of the standards at the proper time. On arriving at the place where the grain is to be deposited, the dropper raises the lever R, when all the moving parts of the dropping mechanism reverse their operation. The rotating blocks, making a partial revolution, sweep the grain off the plates to the ground, to be covered by the wheels. The shaft O being provided with openings at opposite sides corresponding with the recesses in the standards, and each rotating block being provided with two projections for holding and two projections for sweeping off the grain, it therefore follows that each movement, after the first of the lever R, either up or down, deposits a sufficient amount of grain to form a hill on either side of the planter.

The weight of the dropper on the seat I tends, by means of the bar X, to force the runners W W the proper depth into hard ground, and the spring S' tends to relieve the runners of the weight of the dropper for soft ground. The screw B can be turned down so as to relieve the runners entirely from the weight of the dropper for very soft ground, or the clasp C' can be turned backward on its pivot, allowing the whole weight of the dropper to force the runners into very hard ground.

I claim as my invention—

1. The combination of the segment Q, pinion P, shaft O, with the groove V, the sliding bar T, pawl U, fingers Y Y, upright shafts A' A', and the rubber cut-offs J' J' J' J', as herein described.

2. The spring S' and clasp C', operating in combination with the bar H, seat I, and bar X, substantially as herein set forth.

A. J. GREENMAN.

Witnesses:
B. F. LATHAM,
A. S. PERRIGO.